June 17, 1930.  W. B. BURNLEY  1,764,546
STREET MARKING APPARATUS
Original Filed Nov. 25, 1925    2 Sheets-Sheet 1

WITNESSES

INVENTOR
William B. Burnley
BY
ATTORNEYS

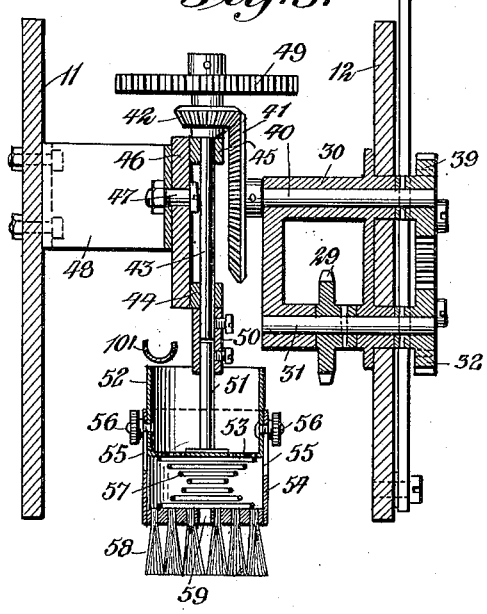

Patented June 17, 1930

1,764,546

UNITED STATES PATENT OFFICE

WILLIAM B. BURNLEY, OF LOS ANGELES, CALIFORNIA

STREET-MARKING APPARATUS

Continuation of application Serial No. 71,336, filed November 25, 1925. This application filed October 22, 1926. Serial No. 143,530.

My invention relates to portable apparatus for applying liquids to surfaces, and it has particular reference, although not necessarily, to apparatus for marking streets, highways and the like in a manner to form thereon a line or lines for defining pedestrian and vehicular traffic zones.

The present application is a continuation of my application Serial No. 71,336, filed Nov. 25, 1925, and allowed May 11, 1926.

It is a purpose of my invention to provide a street marking apparatus having one or more brushes, each rotatable about a vertical or substantially vertical axis in a manner to produce a circular painting motion of the brush as the apparatus advances along a street whereby the formation of a clearly defined mark or line on the surface of a street for traffic purposes is accomplished with facility and dispatch and with a minimum consumption of paint or other marking fluid.

It is also a purpose of my invention to provide a street marking apparatus in which each brush is urged into marking contact with the street, but yieldable to accommodate itself to undulations in the street thereby insuring the proper marking of a given path and in no way impeding the forward travel of the apparatus or injuring the brush.

A further purpose is the provision of street marking apparatus having a novel form of paint feeding mechanism.

The invention is illustrated in the drawings of which,

Figure 3 is a transverse section taken on the line 3—3 of Figure 2;

Figure 4 is a partial side elevation of Figure 3;

Figure 5 is a section taken through the fluid trough and feeding chute;

Figure 6 is a partial plan view of the portion of the machine relating to the fluid feeding apparatus.

Figure 1:
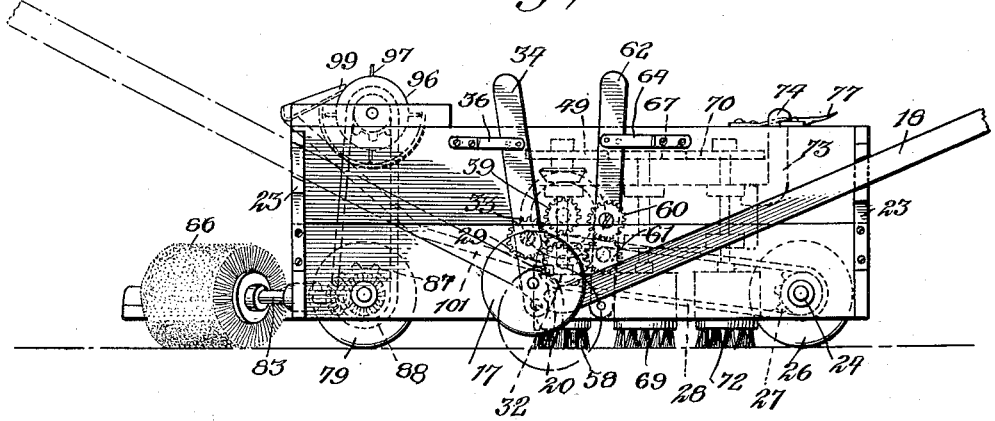
Figure 1 is a side elevation of the device.

In the preferred embodiment of my invention as shown in the drawings I provide a frame formed of four longitudinal wall members 10, 11, 12 and 13 connected at their respective ends by transverse wall members 14 and 15. A pair of wheels 16 and 17 are mounted on the ends of levers 18 and 19, these levers being pivoted as shown in Figure 1 at points 20 to the outside walls 10 and 13. The levers at their other ends are connected by a crossbar 21 so that they can be operated simultaneously. When the levers are in the positions shown in full line in Figures 1 and 2 then the wheels 16 and 17 are elevated from the ground and the device rests on other wheels hereinafter described. When, however, levers 16 and 19 are moved to the dotted position shown in Figure 1 then the wheels are lowered to rest on the ground and their movement to their ultimate position will elevate the device from the ground so that it can be easily moved around as desired on wheels 16 and 17. The levers are preferably engaged near their ends by spring clips 22 and 23 as shown in the drawings, these clips being merely sufficient to hold the levers in their position at either end.

Extending across a frame at one end is a shaft 24 on which are mounted wheels 25 and 26. A sprocket 27 is mounted on a shaft and rotates therewith. To this sprocket is connected a chain 28. The other end of the chain engages a sprocket 29 mounted on a bracket frame 30 attached to the wall 12. This sprocket 29 is mounted on a shaft 31 extending through the wall 12 and having a gear 32 thereon. This gear 32 is adapted to mesh with idler pinion 33 mounted on a movable bar 34 pivoted at 35. This bar is held in a normal inoperative position as shown in Figure 4 by a spring clip 36. A pin 37 on the bar is adapted to engage with a hole 38 on the clip when moved to its operative position in which the gear 32 meshes with the pinion 33 and this in turn meshes with a gear 39 mounted on a shaft 40, the other end of which carries a bevel gear 41 meshing with a bevel pinion 42 mounted on a vertical shaft 43. This shaft is mounted in bearings 44 and 45, connected to a plate 46 which is of considerable length and extends rearwardly from the shaft 43. This plate 46 is pivotally fastened by means of a bolt 47 to a bracket frame 48 connected to the wall 11. The upper end of shaft 43 is provided with a gear 49. The lower end of the shaft 43 is provided with a sleeve 50 into which a stub shaft 51 is fastened. This stub shaft carries a fluid container 52 having a perforated bottom 53. An auxiliary brush-carrying casing 54 is slotted at 55 to receive adjustable pins 56 on the container 52. A spring 57 is disposed between the bottom of the container 52 and the bottom of the brush-carrying casing 54. Brush bristles 58 are disposed in the bottom of the casing 54 and an aperture 59 is provided in the bottom of the casing 54 to permit the fluid to pass therethrough. The spring will tend to hold the brush 58 downward against the street and yet by reason of its association with the paint or fluid container 52 it will be permitted a certain vertical sliding movement which will be resisted only by the spring so that the brushes are always held firmly and yet resiliently against the pavement.

If it is desired to reverse the motion of the shaft 43 from that previously described the idler pinion 33 is withdrawn and two idler pinions 60 and 61 mounted on a movable bar 62 pivoted at 63 to the wall 12 are moved into engagement between the gear 32 and gear 39. A bar 62 is engaged by a spring clip 64 having a pin 65 engaging in a hole 66 in the manner previously described to hold the bar in its upright position.

Figure 2:
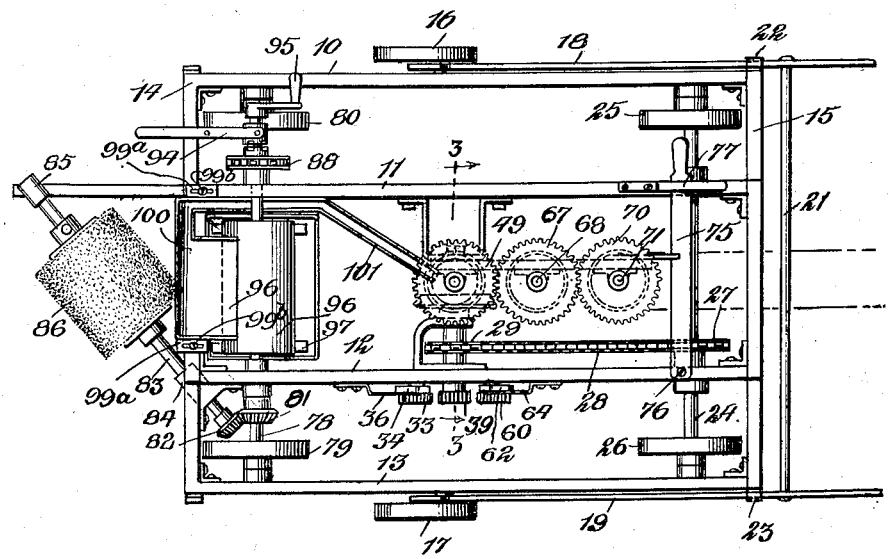
Figure 2 is a plan view thereof.

As shown in Figure 2 the gear 49 on the top of shaft 43 meshes with the gear 67 mounted on the top of a shaft 68 fastened by means of bearing plates to the plate 46 on which the shaft 43 is mounted. The lower end of the shaft 68 is provided with a brush member 69. The gear 67 meshes with the gear 70 mounted on a shaft 71 which is similarly connected to the plate 46. This shaft 71 has a brush element 72 at its bottom. These brushes are preferably resiliently mounted in any desired manner, although they are not provided with means for receiving fluid or paint as is the brush element 58.

The rear end of the plate 46 is provided with an upwardly extending arm 73 having a hook portion 74 adapted to rest on a movable crossbar or handle 75 so as to hold the plate 46 with the brushes in their operative position. This handle is pivoted at one end 76 to the top of wall 12 and is held in position on the top of wall 11 at the other end by means of a spring latch 77 which, when raised, will release the handle and permit it to be withdrawn to the right, as shown in Figure 2, which will withdraw the handle from the hook member 74 and permit the plate 46 to be rotated around the bolt 47, thus permitting the brushes to be elevated and thus rendered accessible for cleaning and repairing. This is possible because the bolt 47 and the shaft 40 are in alinement, thus making possible the continuous engagement of the bevel gear 41 and the bevel pinion 42, during all this movement of the plate 46.

At the front of the frame is transversely pivoted a shaft 78 on which are mounted wheels 79 and 80 adapted to contact with the ground. The shaft 78 is provided with a bevel pinion 81 meshing with a bevel pinion 82 connected to a shaft 83 which at its ends is pivoted at 84 and 85 on the frame of the machine. This shaft carries a brush 86 which is disposed in advance and in line with the travel of the brushes, so that as the device is rolled along the street on the wheels this brush will will be rotated to clean a path in the street directly in advance and in line with the brushes, prior to the application of paint to this portion of the pavement.

The shaft 78 also carries a sprocket 87 to which a chain 88 is connected. This chain extends upwardly to a sprocket 89 mounted on a sleeve 90 mounted on a shaft 91. This sleeve is provided with a clutch member 92 engageable with a slidable clutch member 93 operated by a lever 94 pivoted to the wall 14, the clutch member 93 rotating with the shaft 91. A handle 95 can operate the shaft 91 independent of the clutch and the sprocket 89. On the shaft 91 located between walls 11 and 12 is a drum 96 having stirring paddles 97 thereon. This drum depends into the trough 98 supported in any suitable manner on the frame of the machine, and is adapted to contain paint or fluid. A scraper plate 99 bears against the forward surface of the drum and as the drum rotates in the direction indicated by the arrow in Figure 5 the paint or fluid is scraped off the drum and flows down the plate 99 into the trough 100 where it collects. It travels then through a chute 101 to a point over the paint container 52 previously mentioned as associated with the first brush 58. The rotation of the drum 96 can, of course, be regulated so as to stir up the paint faster and thereby feed it to the brushes faster if desired. When, however, this speed has once been fixed, it only varies thereafter in proportion to the speed at which the device is rolled along the ground. And hence the rate of feed of paint to the front brush 58 is caused to vary in direct proportion to the rotational speed of the drum, thus as the speed of travel of the aparatus varies the rate of paint feed will vary accordingly. In other words, when the apparatus is traveling at a slow rate of speed a relative small amount of paint is supplied to the brush 58 while when the speed of travel is rapid a relatively large amount of paint is delivered to the brush. However, the exact amount of paint delivered in proportion to the speed of travel can be controlled at will by an adjustment of the scraper 99 as it will be understood that the amount of paint removed from the drum is increased or decreased according as the scraper is moved toward or away from the periphery of the drum. As shown in Figure 6, the scraper is capable of being adjusted as described by the provision of flanges 99ª slotted to receive screws 99ᵇ secured in the frame of the apparatus. The handle 95 is provided to stir up the paint when the clutch is disconnected and before the device commences to be rolled along the ground, in order that the paint may be stirred up properly and fed in the desired amount to the paint container, while the apparatus is not moving along the street. This is particularly desirable at the beginning and end of any marking process.

In the operation of the apparatus it is wheeled out on the wheels 16 and 17. When the seat of action is reached the levers 18 and 19 are moved to the positions shown in dotted lines in Figure 1, thus loading the apparatus on the wheels 25, 26, 79 and 80. If the brushes are to be turned in a given direction the bar 34 is moved to its operative position. The handle 95 is then turned a few times with the clutch open to stir up the paint and feed a predetermined amount to the paint container. After that the clutch is thrown in and the device trundled along the ground. During this time, as the street is cleaned in advance of the brushes the paint is continuously stirred up and fed to the container and the brushes are rotating, the first brush applying the paint and the rear brushes rubbing it into the pavement. If the brushes are to be reversed in their rotation the bar 34 is moved to its inactive position and the bar 62 is moved to its active position.

An important feature of my invention is the mounting of one or more brushes of the disk type for rotation about one or more vertical axes so that the working face of the brush is caused to describe a circular movement when in contact with the street or other surface to be painted. By virtue of this circular brush movement the bristles are given a motion similar to that of the ordinary hand brush in painting and as a result the proper and thorough application of paint to a surface is secured to the extent of filling or covering minute crevices and depressions, and thereby producing a line or strip thoroughly painted from edge to edge. Further, the circular motion of the bristles tends to confine the paint within the area of the brush so that a line of a width corresponding to the diameter of the brush is produced, and a line, the edges of which are even and parallel.

Another important feature of my invention is the mountings for the brushes. These mountings serve to yieldably urge the brushes into contact with the surface being painted and with sufficient pressure to cause the brushes to properly apply the paint but without injuring the bristles, yet the brushes are allowed to yield vertically when encountering any surface undulation in order to properly paint such undulation and with no impediment in the forward movement of the apparatus. Continued rotation of the brushes in one direction will ultimately produce a lateral distortion or bending of the bristles thus shortening the life of each brush. To overcome this objection, the direction of brush rotation can be reversed from time to time thereby exerting a lateral pressure in the opposite direction to restore the bristles to normal position.

What I claim is:

1. In a street marking apparatus, a shaft, a cupped element fixed to the shaft and having a perforated bottom, a second cupped element movable beneath the first element and having an opening in its bottom, a spring interposed between the elements for yieldably urging the lower element downwardly, a brush on the lower element, and means for supplying a marking fluid to the upper element whereby the fluid is caused to gravitate to the interior of the brush.

2. A street marking apparatus which comprises a plurality of painting brushes, a plate on which they are mounted for rotation, a frame to which said plate is pivotally mounted, means for holding said plate in a predetermined operative position, said plate adapted to be moved around the pivot point to move the brushes to an inoperative position in which they are inverted, so that they are accessible for cleaning.

3. A street marking apparatus which comprises a frame, a fluid reservoir, thereon, a paddle stirring device in the reservoir, means for operating said stirring device as the machine is moved along the street, means for disconnecting said operating means and manual means for actuating the stirring device independent of said operating means.

4. In a street marking apparatus, a plurality of brushes supported for rotation about vertical axes and arranged one in advance of the other to describe substantially the same path when moved bodily in the normal direction of travel of the apparatus over a surface, means for rotating the brushes in either direction, to flex the brush bristles in one direction or the other when the brushes are in brushing contact with the surface and thereby prolong the lives of the brushes, means for supplying paint to at least one of the brushes, and means for moving the brushes bodily over and in brushing contact with the surface.

5. A street marking apparatus comprising a wheeled support adapted to be rolled over the surface of a street, a brush, means for mounting the brush on the support for rotation about a vertical axis and in brushing contact with the surface of the street, means for supplying paint to the brush, driving means for the brush operable in response to rolling movement of the support to effect rotation of the brush and thereby cause the formation of a clearly defined mark or line on the surface of the street, and means by which the direction of rotation of the brush with respect to that of the driving means can be reversed at will to thereby cause flexing of the brush bristles in one direction or the other.

6. In a street marking apparatus, a brush, a tank above the brush adapted to contain a marking liquid, a drum rotatable in the tank to elevate liquid therefrom on its periphery, a scraping element for removing liquid from the periphery of the drum, means for mounting the scraping element for sliding movement towards and away from the drum to vary the quantity of liquid removed by the scraping element from the drum, means for securing the scraping element in a selected position of adjustment, and means for conducting to said brush, liquid removed from the drum by the scraping element.

WILLIAM B. BURNLEY.